Dec. 30, 1969   J. A. ZIEGLER   3,486,904
PREPARATION OF PREFRIED CEREAL BREADING
Filed Oct. 22, 1965   2 Sheets-Sheet 2

*INVENTOR.*
JOHN A. ZIEGLER
BY *Fetherstonhaugh & Co.*
ATTORNEYS

United States Patent Office 3,486,904
Patented Dec. 30, 1969

3,486,904
PREPARATION OF PREFRIED CEREAL BREADING
John A. Ziegler, Scarborough, Ontario, Canada, assignor, by mesne assignments, to The Griffith Laboratories, Incorporated, Chicago, Ill.
Filed Oct. 22, 1965, Ser. No. 500,514
Int. Cl. A23l 1/10
U.S. Cl. 99—1                3 Claims

ABSTRACT OF THE DISCLOSURE

This invention relates to a method for making a cereal breading material that is deep fat fried wherein sheets of cereal dough are formed with slits to control the cross section in a deep fat frying operation to yield deep fat fried sheets having a predetermined fat and moisture content that adapts the product for use as a breading. The fried sheets are then ground into crumbs.

---

Figure 1:
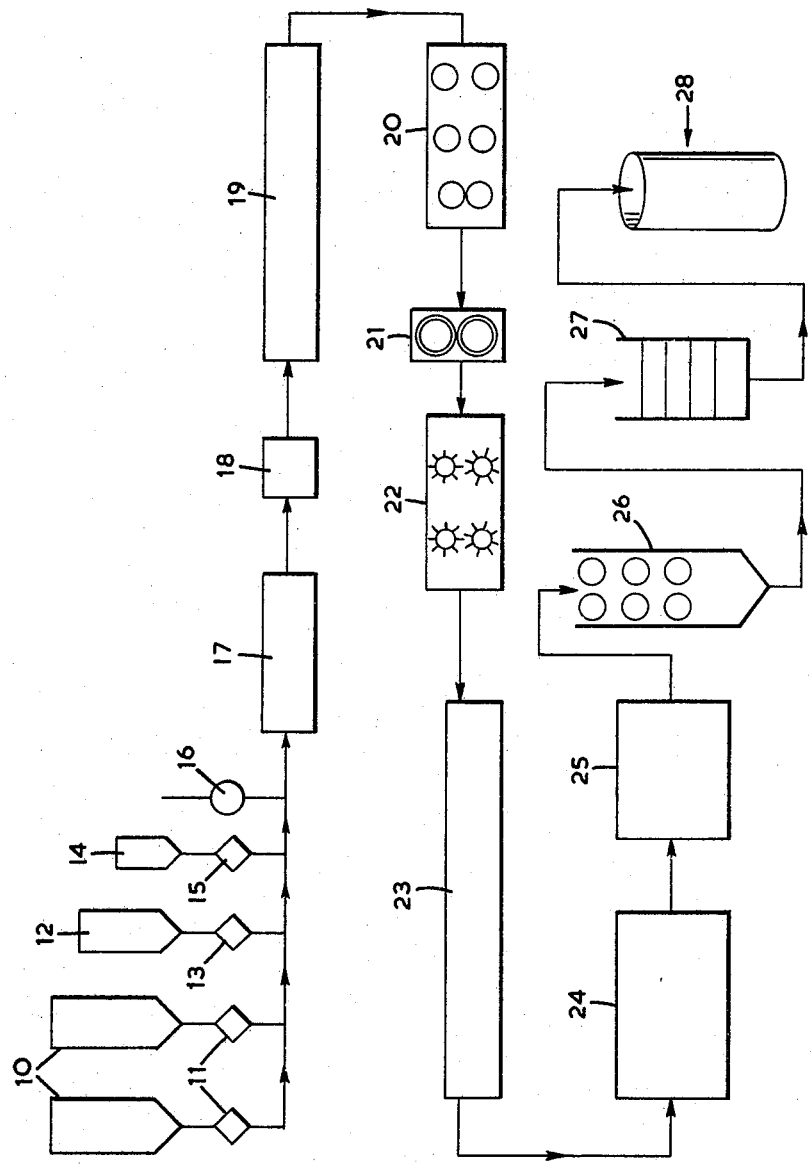

This invention relates to prefried cereal breading having a deep fried flavour and colour and its application to fresh or frozen food portions of fish, poultry, meat or the like. It is common practice to prepare portions of fish, poultry, meat or the like for subsequent heating and consumption by coating the portion in a fluid batter, applying a coating of a granular baked breading, cooking the food and dehydrating or setting the batter-breading coating by immersion in a hot, deep fat, cooling and freezing. The so prepared frozen food is stored until it is desired to use it, at which time it is usually reheated in an oven at about 400° F. to thaw it and cook it to taste prior to serving. The double cooking, once by deep fat frying and once by oven heating, spoils much of the delicate flavour of the coated food portion.

It has not previously been possible to utilize ground baked breadings by applying them to battered food portions, freezing them without deep fat frying and holding and distributing them in the frozen state with the intention that the consumer should perform the sole cooking in the oven because such batter-breading coatings have lacked adhesion, with the result that the covering of the food portion by the batter and breading lacks continuity when it is attempted to cook the product in the oven. Moreover such batter-breading coatings acquire a severely wrinkled or blistered appearance and the resulting product is most unattractive. Most importantly, it lacks the characteristic deep fried flavour.

It is therefore an object of this invention to provide a prefried breading having a cohesion and continuity suitable for application to a food portion that has been coated with an uncooked batter for further storage and subsequent heating.

It is a further object of this invention to provide a granular prefried cereal breading having a deep fat fried flavour and colour which can be used to coat fresh or frozen food items.

It is a further object of the invention to provide a granular prefried breading which may be applied to food items that are to be kept in frozen storage prior to use to obviate the necessity of deep fat frying.

With these and other objects in view, a breading having a deep fat flavour and colour is prepared by forming a dough into strips having a predetermined cross-section, cooking the strips in a deep fat cooking medium of a predetermined temperature, the cross-section of said strips being adapted to achieve a through cooking of said strips in said deep fat cooking medium with a fat content in said strips after cooking of between 15 and 25% and with a moisture content in said strips after cooking of between 3% and 15%, removing said strips from said deep fat cooking medium, cooling said strip and grinding said strips into crumbs. A breading so formed can be adhered to a food portion, stored and subsequently oven cooked to give a food portion that is coated with a breading that has a deep fried flavour and colour. The invention will be clearly understood after reference to the following detailed specification read in conjunction with the drawings.

Figure 2:
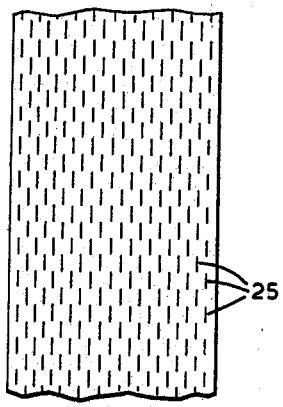
Figure 3:
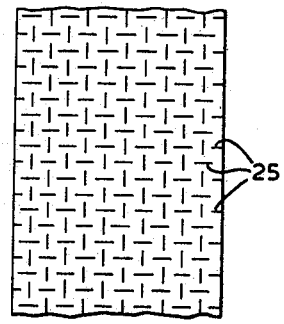
Figure 4:
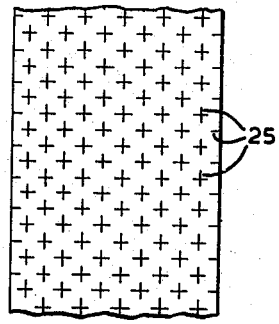

In the drawings:
FIGURE 1 is a schematic illustration of the carrying out of the process of forming bread breadings according to this invention, and
FIGURES 2, 3 and 4 illustrate the scoring of a ribbon-like strip of bread dough in the process.

A continuous processing system for forming breading according to the invention is illustrated in FIGURE 1. The numeral 17 refers to a dough mixer that is supplied with flour from the receptacles 10 through metering devices 11, seasonings consisting essentially of a mixture of salt, dextrose, skim milk powder, monosodium glutamate, spices and spice extractives from the hopper 12 through metering device 13, yeast or an equivalent chemical leavening from receptacle 14 through metering device 15 and attempered water from a water supply through metering valve 16. All of the foregoing elements are blended intimately into a coherent dough which is passed through a divider 18 and then to a fermentation chamber 19, where it remains for a period of one to ninety minutes at a temperature of from 70° to 110° F., depending upon the extent of fermentation or proofing desired. This, it will be appreciated, is a matter of preference.

The proofed dough is then admitted to a series of reduction or sheeting rolls 20, each succeeding pair of rolls being adjusted closer together than the previous pair of rolls thereby to achieve gentle and progressive reduction in thickness to produce a continuous ribbon-like strip of dough of uniform density, preferably between 3/32 to 1/4 of an inch thick. After passage between a set of trimming knives 21, adjusted to cut the dough ribbon to uniform width of between 24 to 36 inches, the ribbon-like strip passes through the orientation device 22, which consists essentially of a series of rolls having a plurality of intermeshing knife-like projections which perforate the dough with a number of through slits arranged according to the pattern of FIGURE 2. FIGURES 3 and 4 illustrate alternative slit patterns. These through slits are adapted to admit the cooking fat, within which the strip is subsequently cooked, to permit the fat to achieve a through cooking of the strip with a predetermined fat and moisture content. In this embodiment the desired cross-section of the strip to achieve the desired end fat and moisture content is achieved by a slit pattern.

The thus oriented strip of dough is conveyed through a deep fat frier 23 containing vegetable oil or shortening heated and thermostatically controlled to a temperature of between 375° and 410° F. at a controllable rate such that the dough is completely immersed in the hot fat for a period of about 2 to 5 minutes. The frying conditions as to temperature and time are adjusted so that doughs of different moisture contents are cooked with full colour development and to achieve a desired moisture content and deep fried flavour in the finished product. A deep fried flavour is a characteristic flavour created in a food product by cooking by total immersion in a heated deep fat.

After frying the still intact strip passes between a series of air jets 24 to remove excess fat, then through a cooler 25 in which the temperature of the cooked product is reduced to about 60° to 70° F. The cooled ribbon, which is now quite brittle, is conveyed to a series of breaker rolls 26, where it is gently crushed and ground into particulate form. After the grinding, the product is screened in the classifier 27 to achieve the desired granulation and is then packaged as a finished product as at 28 for application to food products, as will be described later.

The various operations are capable of considerable variation. Concerning perforation or scoring, it should be noted that the purpose is to arrange the cross-section of the strip to permit the hot fat to flow through the slits during the frying operation. If the slits of the scoring pattern do not completely perforate the dough or if the pattern is altered so that the slits are too far apart, then the dough cooks unevenly, produces blisters and a spotty or speckled colour results when the fried product is granulated. Moreover, the moisture content of the finished product is important, as will be apparent later, and it will tend to be too high if the slits are spaced too far apart because of undercooking in the large areas between the slits. It has been found that a mositure content of between five and seven percent in the finished product gives a product with best storage stability. As the moisture increases much above 15%, there is a danger of mould developing. Conversely, a product with a very low moisture content, say, one to two percent, tends to become rancid quickly. Moisture contents of between three and ten percent in the finished product are considered good practice.

Desirably each slit may be five to eight mm. long and is spaced a like distance from the succeeding or preceding slit, as viewed in FIGURE 2, but the end of the slit should be only half the distance of its total length from the neighbouring lateral line of slits, thus achieving a pattern roughly resembling a basket weave.

Concerning dough moisture, it has been found that moistures in the range of 28% to 44% are satisfactory. This, however, as is well known to master bakers, varies with the flour. Flour varies in its ability to absorb water and in forming a dough to give a desired consistency. Different flours require different water additions. It is largely dependent on the quantity and quality of gluten in the flour and the extent of the starch cell rupture during milling. Some flours work well with a dough moisture content of 28%; others work best with higher moisture contents. This is something that one skilled in the art would determine for each particular mix, depending upon the flour. Concerning the consistency of the dough, it should not be too stiff, otherwise frying would be accomplished too rapidly and the amount of fat in the finished product would be higher than the desired upper limit of 25%, which will be referred to later. If the dough moisture is much above 44%, the dough is too soft and difficult to handle. Moreover it requires too long a frying period to cook out the extra water. The optimum moisture content of the finished product is a function of cooking time and is between 5 and 7%, as noted above. Three to ten percent moisture in the finished product is good and three to fifteen percent moisture in the finished product are the workable limits for a commercial product.

The invention is further illustrated by the following specific examples:

In a first example three thousand grams of hard wheat flour, sixty-seven grams of non-fat dry milk solids, eighteen grams of monosodium glutamate, one hundred and sixty grams of salt and seven grams of dry soluble pepper flavour were mixed with a solution of thirty-two grams of active dry yeast dissolved in eleven hundred millilitres of water at one hundred and twenty degrees Fahrenheit in a conventional batch type mixer for six minutes until a smooth dough was obtained The dough was covered with moist cheesecloth and placed in a proofing chamber at one hundred and five degrees Fahrenheit for one hour, after which it was run through a series of four sheeting rolls to yield a ribbon of dough three thirty seconds of an inch thick. The ribbon was cut into six inch square sheets and each sheet was oriented and perforated with a slit pattern according to the illustration in FIGURE 2, each slit being eight millimeters long. The thus prepared sheets were immersed for four minutes in a bath of vegetable shortening heated to four hundred degrees Fahrenheit, then removed therefrom and excess surface fat was blown off with a stream of compressed air. After cooling to room temperature (70° F.) the deep fat fried sheets were ground in a roller mill to pass a twenty mesh screen, the larger particles being returned to the mill, and the suitably granulated product was collected.

The foregoing procedure was duplicated in a second example, with the exception that the orientation pattern of FIGURE 3 was employed. The slits are about the same length as those of FIGURE 2, i.e., 8 mm.

The procedure was again duplicated in a third example, with the exception that the orientation pattern of FIGURE 4 was employed. The slits are about the same length as those of FIGURE 2, i.e., 8 mm.

The products were analyzed for total fat content by Method 22.032, Official Methods of Analysis of the A.O.A.C., 9th edition, 1960, page 287, moisture by a Brabender Semi-Automatic Moisture Tester Type FD and general appearance of the granules. Results were as follows:

| | Total fat content, percent | Moisture percent | Appearance |
|---|---|---|---|
| Example 1 | 15.5 | 3.4 | Granules uniformly golden brown. |
| Example 2 | 16.2 | 2.1 | Do. |
| Example 3 | 14.0 | 4.4 | Do. |

It will be noted that the appearance of the end product in each case was good. The product in each case when fresh had a characteristic deep fat fried flavour. The slit pattern had an effect on the moisture content, the pattern of FIGURE 3 giving the lowest moisture content in the finished product. End moisture content is thus a function of the slit pattern. In Example 2 the moisture is slightly lower than the preferred lower limit, but the product was suitable for immediate use. It would lack storage stability.

Variations in the procedure of Example 1 were made in respect of ribbon thickness and frying temperature to determine the effect on moisture content in the finished product and fat content in the finished product.

It has been determined that the product of the invention, besides having an even golden colour and a deep fat fried flavour, should also have a moisture content within the range of 3% to 15% and preferably within the range of 5% to 7% in order that it may be stored for a reasonable time without becoming rancid or mouldy. Products with moisture contents below 3% become rancid in a matter of several days under accelerated storage conditions. Products with moisture contents over 15% become mouldy in a few days.

It has also been determined that the product must not have a fat content that is too high or it becomes pasty, sticky and not free flowing. Breadings are, in accordance with standard practice, applied by machines and a breading that does not flow freely is unsatisfactory. Fat content of 18%–22% is preferred, althought contents up to 25% are permissible. Fat content is, of course, a function of the exposure of the product to the cooking fat and will vary with the ribbon thickness, slit configuration and frying time.

As the ribbon thickness is reduced, all other factors remaining the same, the fat content in the finished product goes up because of the increased exposure of the dough to the fat and the moisture content goes down for the same reason. Increasing the ribbon thickness has the opposite effect.

Following are experimental results, all with batch made dough the same as in Example 1 but with variations in sheet thickness and frying temperature and frying times.

|  | Sheet thickness, inch | Frying temp., °F. | Frying time, secs. | Finished Product | | | |
|---|---|---|---|---|---|---|---|
|  |  |  |  | Moisture, percent | Fat, percent | Schaal stability, hrs. | Remarks |
| Example: |  |  |  |  |  |  |  |
| 4 | 1/16 | 375 | 180 | 12.1 | 15.9 | 300 | Uneven colour. |
| 5 | 1/16 | 375 | 240 | 6.8 | 16.1 | 300 | Slightly speckled. |
| 6 | 1/16 | 375 | 300 | 5.0 | 18.0 | 240 | Fairly uniform colour. |
| 7 | 1/16 | 400 | 180 | 2.7 | 18.3 | ca. 72 | Dark brown colour |
| 8 | 1/16 | 400 | 210 | 1.9 | 21.0 | ca. 48 | became rancid |
| 9 | 1/16 | 400 | 240 | 1.2 | 21.6 | ca. 48 | quickly. |
| 10 | 3/32 | 410 | 180 | 10.2 | 12.7 | 300 | Fairly good colour. |
| 11 | 3/32 | 410 | 210 | 7.3 | 11.4 | 300 | Excellent golden |
| 12 | 3/32 | 410 | 240 | 3.4 | 15.5 | ca. 120 | brown colour. |
| 13 | 1/8 | 410 | 180 | 12.0 | 13.7 | 300 | Slightly speckled pale brown. |
| 14 | 1/8 | 410 | 240 | 8.1 | 15.0 | 300 | Fairly good. |
| 15 | 1/8 | 410 | 300 | 4.7 | 14.6 | ca. 200 | Fairly uniform brown colour. |
| 16 | 1/4 | 410 | 180 | 15.5 | 10.5 | 300 | Uneven colour. Damp. Became mouldy 5 days. |
| 17 | 1/4 | 410 | 240 | 11.5 | 12.8 | 300 | Slight speckled. Texture soft. |
| 18 | 1/4 | 410 | 300 | 9.1 | 13.1 | 300 | Slightly speckled more crisp texture. |

Although it is possible under the conditions described in this application to deep fry a 1/16 inch thick sheet and obtain a fairly acceptable product with a reasonably uniform colour (Examples 4–9), the best results were obtained with a 3/32 inch thick sheet deep fried at about 400° F. for approximately 3½ to 4 minutes (Examples 10–12). Under these conditions with the strip pattern of FIGURE 2 the heat penetration through the dough appears to be such that uniform and complete cooking is achieved with development of colour throughout and the granulated product has a smooth golden brown colour without specks or lighter particles. As the dough thickness approaches ¼ inch, it is difficult to achieve uniform colour development with the result that the granulated product appears speckled (Examples 16–18). It is to be understood that this is not necessarily undesirable and that, in fact, this speckled appearance may contribute a "homemade" character to the product to which it is applied.

The Schaal test gives a rough indication of the stability of the product against the development of organoleptic rancidity. The test was conducted according to the method described in Bailey's Industrial Oil and Fat Products, 3rd Edition 1964, page 82. Stability is related to moisture content as noted above, and it will be noted that with lower values for stability hours in the Schaal test, the moisture content was low and in fact less than 3%. Products with a moisture content of over 15% become mouldy quickly and in the order of five days. Moist product with over 15% moisture is a much more suitable environment for the development of mould than a product with 3% to 10% moisture.

It has been found that with very thin sheets, the amount of fat picked up by the breading during frying is greater than it is when the sheet becomes thicker. It is believed that the reason for this is the more ready and complete penetration of the thin sheets by the frying medium. As the thickness increases, a thin surface film is formed on the sheets, which tends to reduce the amount of fat absorbed, and as the thickness approaches ¼ inch, this inhibition of fat penetration also tends to reduce the cooking and colour development of the centre of the sheet with the result that the finished granulated product tends to have a mottled or speckled appearance.

In a further Example 19 the continuous dough making system described in FIGURE 1 was used with the general dough formula of Example 1. The following ingredients were metered at a constant rate into the continuous dough mixer:

Hard wheat flour _____lb. per minute__ 50
Seasoning [1] _____lb. per minute__ 4.2
Active yeast suspension [2] _____fl. oz. per minute__ 60
Water at 110° F. _____gallons per hour__ 87

[1] The seasoning contained salt, non-fat dry milk solids, monosodium glutamate and dry soluble pepper flavour.
[2] The yeast suspension contained 1 part active dry yeast plus 6 parts water at 95° F.

The dough was run through a proofing chamber for a residence time of 60 minutes with an air temperature of 108° F. and was sheeted 1/8 inch thick, trimmed to a ribbon 24 inches wide and oriented according to the pattern of FIGURE 2. The ribbon was passed through a continuous deep fat fryer containing vegetable shortening heated to 400° F. for a total residence time of 270 seconds, excess fat was removed with compressed air and the fried ribbon was cooled in a current of chilled air, then ground in a roller mill and classified through 20 mesh screens. The granulated product had a uniform golden brown colour, an attactive deep fried flavour and contained 4.2 percent moisture and 17.3 percent fat.

In further Example 20 the formulation of Example 1 was duplicated by batch mixer, except that the yeast was omitted and thirty grams of baking powder was substituted for the yeast. The resulting dough was not proofed but was sheeted 3/32 inch thick, cut into 6 inch squares and was oriented according to the pattern in FIGURE 2, after which it was deep fried in vegetable shortening at 400° F. for 3½ minutes. Excess fat was removed with compressed air, the deep-fried sheet was cooled to room temperature (70° F.) and ground and classified as before to pass a 20 mesh screen.

The finished product had a golden brown colour, contained 3.1% moisture and 17.4% fat and had a good deep fat fried flavour slightly different in mellowness and richness associated with the flavour of the product from Example 1.

In Example 21 an unleavened dough was prepared according to the formulation of Example 1, with the exception that the yeast was omitted and no leavening nor proofing treatment was given. The oriented sheets 3/32 inch thick were deep fried in vegetable shortening at 375° F. for 3½ minutes and were cooled, ground and screen classified as before. The resulting product contained 5.2% moisture and 16.8% fat, and the granules had a uniform toasted brown colour. Although the flavour was entirely acceptable, it was discernably different in character from that produced in Example 1.

In use on, say, fish sticks, a batter was prepared from a dry mix of ingredients well known to those skilled in the preparation of such mixtures consisting of modified starch, soft wheat flour, corn flour, salt, monosodium glutamate, spices and spice extractives, by dispersing one part of said dry mix in about 1.1 parts of water at about 55° F. until the dispersion was completely free of lumps.

Frozen fish sticks were dipped in the batter for 15 seconds, drained, and the breading of the invention was applied. The battered, breaded sticks were not deep fried as they would ordinarily be, but frozen with the batter uncooked at about −15° F. and stored. After storage they were then placed in an oven and oven cooked at 425° F. for 15 minutes to cook the frozen fish. The fish stick was well cooked and had a dry, unwrinkled, even, deep brown coloured coating of breading that had a characteristic deep fat fried flavour. The fish, having been cooked for the first time, had a fresh flavour.

As a further example of its use, the breadings of the invention were similarly used on fresh frozen shrimp. The breading remained cohesive and dry as the shrimp was oven cooked following frozen storage, and the flavour and colour were those of a deep fat fried breading.

It will be apparent to those skilled in the art that the invention is a substantial advance in the art. Prior to the invention, breadings, applied as this one can be applied, yielded a cooked product whereon the breading was soggy, often blistered, of poor adhesion, of pale colour and flat flavour. This invention overcomes all of these undesirable characteristics and at the same time improves the flavour of the food portion to which it is applied because it is not necessary to pre-cook it prior to freezing.

The form of the strip need not be a ribbon formed with through slits to achieve a cross-section that will cook in the selected cooking medium to yield an end product with the desired fat and moisture content. The dough can be extruded in strips from a round or like die with a cross-section that will cook in the cooking medium with the same desired result. Following are examples of three different types of dough, each extruded from a die cooked and ground to yield a good product. In each case the product tested well when applied to a food portion that was frozen and reheated as indicated above.

In Example 22 five thousand grams of dough were prepared as described in Example 1, proofed at one hundred and five degrees Fahrenheit for one hour and introduced into an extruding apparatus equipped with an exit die having a plurality of holes 4.5 millimetres in diameter. The dough emerged from the die in the form of continuous round filaments or strands about 4.5–5 mm. in diameter and these were cut by a knife into uniform lengths of 8 inches.

A group of the thus prepared strands were placed in a wire basket and immersed for two and one half minutes in a bath of vegetable shortening heated to three hundred and eighty-five degrees Fahrenheit, then removed therefrom an excess surface fat was blown off with a stream of compressed air.

After cooling to about 70° F., the deep fat fried strands were ground in a roller mill to pass a twenty mesh screen, the larger particles or tailings being returned to the mill, and the suitably granulated product was collected.

The finished product, which was uniformly golden brown in colour, contained 5.9% moisture, 19.1% fat and had a Schaal oven stability in excess of 300 hours.

In Example 23 five thousand grams of dough were prepared as described in Example 1, with the exception that yeast was omitted and thirty grams of baking powder was substituted for the yeast.

The dough was not proofed but was immediately extruded, deep fried and granulated as described in Example 22. The resulting product had a light tan brown colour with an excellent deep fat fried flavour and contained 6.8% moisture and 18.4% fat.

The Schaal oven stability of the product was in excess of 300 hours.

In Example 24 four thousand grams of dough were prepared in accordance with Example 1, except that yeast was omitted and no leavening nor proofing treatment was given. The dough was immediately extruded, fried and granulated as described in Example 22. The resulting product had a toasted brown colour and an acceptable deep fried flavour somewhat different in character from the unleavened product. It contained 5.1% moisture and 19.5% fat, and had a Schaal oven stability of at least 240 hours.

Modifications other than those indicated will be apparent to those skilled in the art, and it is not intended that the foregoing examples should be considered in a resrictive sense.

What I claim as my invention is:

1. A method of making a prefried cereal breading having a deep fat fried flavour and colour, comprising the steps of forming a leavened cereal dough into a flat sheet that has a predetermined thickness, perforating a pattern of mutually-spaced intermeshing slits through the sheet, cooking said sheet in a deep fat cooking medium of predetermined temperature, the thickness of said sheet and the pattern arrangement of said slits being interrelated to achieve a through cooking of said sheet in said deep fat cooking medium, whereby to attain a fat content in said sheet after cooking of between 15% and 25% and a moisture content in said sheet after cooking of between 3% and 15%, removing said cooked sheet from said deep fat cooking medium, cooling said sheet and grinding said sheet into crumbs.

2. A method of making a prefried cereal breading having a deep fat fried flavour and colour as claimed in claim 1, in which the moisture content in said sheet after cooking is between 3% and 10%.

3. A method of making a prefried cereal breading having a deep fat fried flavour and colour as claimed in claim 1, in which the moisture content in said sheet after cooking is between 5% and 7%.

References Cited

UNITED STATES PATENTS

| | | | |
|---|---|---|---|
| 2,905,559 | 9/1959 | Anderson et al. | 99—80 |
| 3,052,545 | 9/1962 | Ducharme et al. | 99—83 |
| 3,236,654 | 2/1966 | Lipka et al. | 99—93 |

RAYMOND N. JONES, Primary Examiner

U.S. Cl. X.R.

99—111